Figure 1:
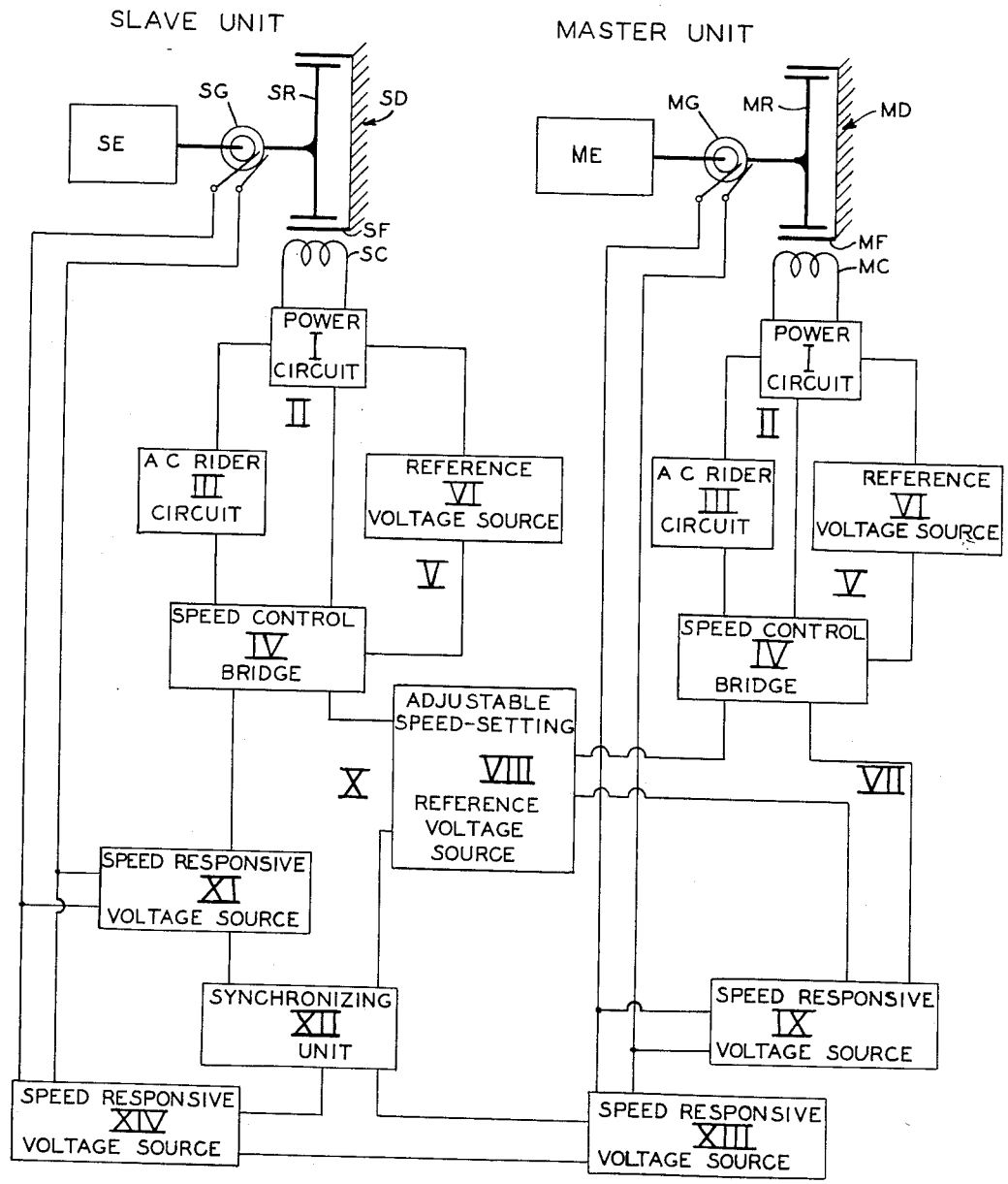

May 1, 1956 R. L. JAESCHKE 2,744,213
CONTROL FOR ELECTRIC MACHINERY
Filed Oct. 12, 1951 2 Sheets-Sheet 1

FIG. I.

Ralph L. Jaeschke,
Inventor.
Koenig and Pope,
Attorneys.

United States Patent Office 2,744,213
Patented May 1, 1956

2,744,213
CONTROL FOR ELECTRIC MACHINERY

Ralph L. Jaeschke, Kenosha, Wis., assignor, by mesne assignments, to Eaton Manufacturing Company, Cleveland, Ohio, a corporation of Ohio Application October 12, 1951, Serial No. 251,011

11 Claims. (Cl. 317—6)

This invention relates to controls for electrical machinery, and more particularly, to electronic controls for variably energized electrical machinery, such as electric couplings, brakes and dynamometers.

One of the objects of this invention is the provision of a control for synchronizing the operation of two or more electrically controlled machines. For example, as described herein, a pair of eddy-current dynamometers may be controlled to operate at the same speed through variations in torque developed by the respective dynamometers.

To accomplish this objective, a master-slave system is employed. The energization of the slave machine, and thereby its speed, is varied by the control of this invention in such manner as to cause the speed of the slave machine to track the speed of the master machine. The control includes a power circuit for energizing the slave machine independently of the energization of the master machine. This power circuit includes a grid-controlled rectifier having a control grid for varying the conductivity of the rectifier and thereby the energization of the slave machine in accordance with the grid voltage applied to the control grid of the rectifier. The grid voltage is supplied by a grid circuit to which is connected a synchronizing control supplying a voltage that is responsive to the difference in speed between the two machines. The input to the synchronizing control comprises first and second voltages responsive respectively to the speeds of the master and slave machines.

Additionally, the control of this invention incorporates a load-control circuit for regulating the energization of the machines, either by itself or in cooperation with the speed control. The load-control circuit supplies the grid-controlled rectifier with a component of grid bias which is inversely proportional to the energization of the machine, in order to maintain the energization of the machine substantially constant in the face of line voltage variations and the like. The result is somewhat like feedback action.

As accomplished herein, the grid circuit for the grid-controlled rectifiers includes a bridge. The load-control circuit is connected in the power circuit to provide a first voltage responsive to the energization of the machine. A second voltage is provided by an adjustable voltage source connected in the load-control circuit and the difference between these voltages is impressed across the bridge. The bridge in turn includes a triode connected in one arm thereof which is under the control of a circuit providing the speed-controlling action. The synchronizing control is also connected to this triode in the case of the slave unit.

The invention accordingly comprises the elements and combinations of elements, features of construction, and arrangements of parts which will be exemplified in the structures hereinafter described, and the scope of which will be indicated in the following claims.

Figure 2:
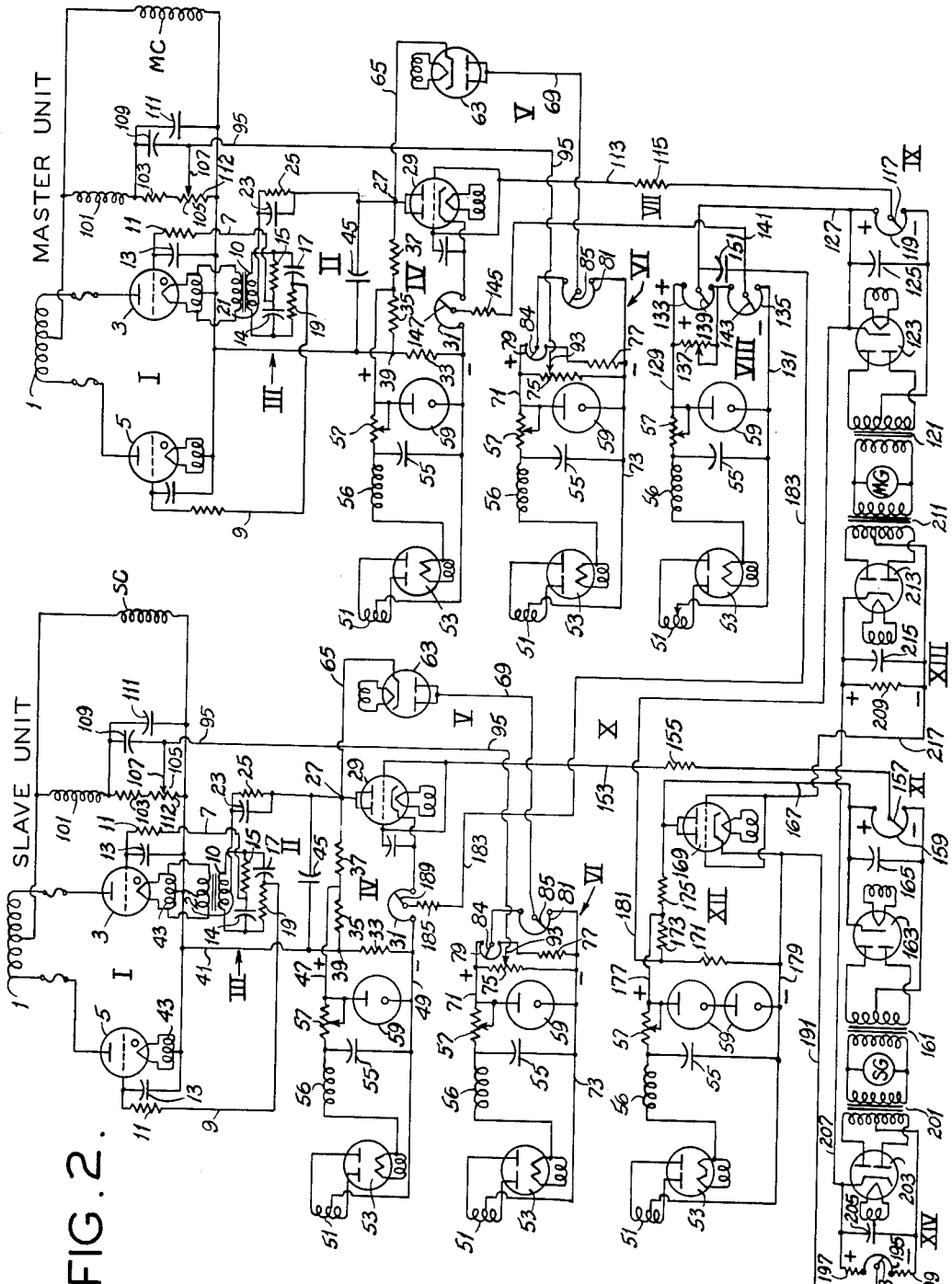

In the accompanying drawings, in which one of various possible embodiments of the invention is illustrated, Fig. 1 is a block diagram illustrating the control of this invention as adapted for the control of two dynamometers; and, Fig. 2 is a detailed circuit diagram of the control shown in the block diagram of Fig. 1.

Similar reference characters indicate corresponding parts throughout the several views of the drawings.

For purposes of explanation, the control is shown as adapted to synchronize the speed of two eddy-current dynamometers. A master electric dynamometer is shown at MD and an electric slave dynamometer is shown at SD. The dynamometers MD and SD have rotary members MR and SR coupled to prime movers ME and SE. The rotary members are braked by magnetic reaction with fixed members MF and SF, which have field coils MC and SC controlling the torque applied to the prime movers by the respective dynamometers. The dynamometers are not shown in detail inasmuch as they are known in the art, and it will be understood that the torque developed by such a dynamometer varies as a function of the excitation of the field coil.

The control has a master unit (so labeled) controlling the energization of the master machine MD and a slave unit (so labeled) controlling the energization of the slave machine SD. Each unit has a power circuit I for independently exciting field coils MC and SC of the master and slave dynamometers MD and SD, respectively. The power circuits of each unit include a grid-controlled rectifier (to be described) which is under the control of a grid circuit II for each unit. The grid circuits II include A. C. rider means III and speed-control means IV for each unit adapted to vary the grid voltage applied to the rectifiers. A load-control circuit V for each unit is connected in the grid circuit II and to the power circuit I to provide feedback for control purposes. This load-control circuit V includes adjustable reference means VI for pre-setting the load.

In the master unit, the speed control IV is under the control of a circuit VII which includes an adjustable speed-setting control or voltage source. VIII and a speed-responsive control or voltage source IX producing a voltage responsive to the speed of the master dynamometer. This speed-responsive control IX includes a generator MG driven with the rotary member MR of the master dynamometer.

In the slave unit, the speed control IV is under the control of a circuit X which includes the above speed-setting control VIII and a speed-responsive control or voltage source XI producing a voltage responsive to the speed of the slave dynamometer SD. The speed-responsive control XI includes a generator SG driven with the rotary member SR of the slave dynamometer. Additionally, the control circuit X in the slave unit includes a synchronizing control XII producing a voltage responsive in amplitude to the difference in speed between the two dynamometers. The input to the synchronizing control includes voltages supplied from means XIII and XIV, responsive respectively to the speeds of the master and slave dynamometers MD and SD. The means XIII and XIV are connected to the generators MG and SG, respectively.

To prepare for operation, the speed-setting control VIII common to both the slave and master units is adjusted so that the two machines operate at a desired speed. When the speeds are synchronized, the output of the synchronizing control XII is preferably zero and the respective speed-responsive controls determine the respective field excitations and the respective speeds of the two machines. The synchronizing control becomes effective to change the energization of the slave machine SD preferably only when there is a speed difference between the two machines as might occur upon a torque change of one of the machines without a corresponding change in torque of the other machine.

In the master unit, the speed-responsive control IX causes the speed control IV of the master unit to vary the conduction of the associated rectifier in such manner that the excitation of the master dynamometer field MD is increased or decreased when the speed of the master dynamometer MD tends to increase or decrease, respectively. Consequently, there is feedback which provides for speed regulation of the master machine.

The synchronizing control XII causes an increase in the field excitation of the slave dynamometer SD when the master dynamometer MD tends to slow down or when the slave dynamometer SD tends to increase speed without a corresponding tendency at the master machine. Should the slave machine make an initial departure from established conditions, the speed-control XI operates to supplement the synchronizing control in correcting for the speed change. When the speed of the master machine changes, the slave speed-responsive control XI opposes the action of the synchronizing control XII and, therefore, the controlling action of the synchronizing unit XII must override that of the slave speed-responsive unit XI. This action is obtained by amplification in the synchronizing unit XII.

Briefly then, the speed-responsive control XI provides regenerative feedback to the slave machine; and the synchronizing control XII provides an overriding action which may be of a feedback, speed-regulating nature, or of an independent speed-changing nature, depending upon whether a torque change external to the control first originates at the slave machine or first originates at the master machine.

It will become apparent that the speed-responsive control XI for the slave machine may be omitted, and speed regulation may be obtained to a considerable degree from the controlling action of the synchronizing unit XII; i. e., the synchronizing control XII regulates the speed of the slave machine SD so long as the speed of the master machine MD remains constant, and the synchronizing control XII changes the speed of the slave machine when the speed of the master machine changes.

Considering the detailed showing of Fig. 2, each of the power circuits I has a power transformer 1 supplying power to the field coils MC and SC. For purposes of simplicity only transformer secondaries are shown, it being understood that suitable primaries and A. C. power supplies are provided. The field-exciting current is rectified and controlled by a pair of grid-controlled gaseous discharge tubes 3 and 5 arranged to fire on alternate half-cycles of the plate supply from 1.

The grid circuits II each include a connection 7 from the grid of tube 3 and a connection 9 from the grid of tube 5. Suitable grid current resistors 11 and transient voltage by-passing capacitors 13 are provided as shown. The A. C. rider circuit III comprises a transformer 10 across which is connected a first circuit including a capacitor 14 and a resistor 15 and a second circuit including a capacitor 17 and a resistor 19. The grid connection 7 is made between the elements 14 and 15 and the grid connection 9 is made between the elements 17 and 19. This arrangement produces an A. C. grid voltage which is in suitable fixed out-of-phase relation with the plate supply voltage from 1 for the power tubes 3 and 5. The grid circuit continues at 21 from a center tap of transformer 10 through an anticipator network including a capacitor 23 and a parallel-connected resistor 25 to one output terminal 27 of the speed control IV, which is in the form of a bridge circuit.

One leg of the bridge circuit includes a dual-triode 29 having its plate connected at 27 and a potentiometer 31 connected to the cathode of the triode 29. The other legs of the bridge consist of resistors 33, 35 and 37 proceeding from 31 to 27, with the other output terminal 39 of the bridge between resistors 33 and 35 being connected at 41 to the cathodes of the power tubes through center-tapped filament transformers 43. A capacitor 45 is connected across the output terminals 27 and 39 of the bridge IV. The input to the bridge is a constant D. C. voltage supplied by a D. C. power supply including a plate transformer 51, a twin-diode rectifier tube 53, a filtering capacitor 55, a filtering choke 56 and adjustable resistor 57 and a voltage regulator tube 59. It will be understood that the bridge IV is balanced and the output is zero when the voltage drop across the triode 29 and resistor 31 equals that across the resistor 33.

The load-control circuit V includes a twin-diode rectifying tube 63 having its cathode connected at 65 to the bridge output terminal 27 and its plate connected at 69 to the reference voltage source VI. This latter circuit includes a D. C. power supply of the type described above under reference numerals 51 through 59, feeding to positive and negative conductors 71 and 73, respectively. A voltage divider 75, and a series network including a resistor 77 and a potentiometer 79, are connected across the conductors 71 and 73. A second potentiometer 81 is connected across the resistor 77 to an adjusting arm 84 on the potentiometer 79. Adjusting arm 85 of the potentiometer 81 is connected to the conductor 69. Adjusting arm 93 of the voltage divider 75 is connected through a conductor 95 to the power circuit I. Suitable adjustment of the arms 85 and 93 will produce a voltage across the conductors 69 and 95 of any desired value and polarity.

There is connected across the field coil (MC or SC) a filtering choke 101, a resistor 103 and a voltage divider 105. Adjusting arm 107 of the voltage divider 105 is connected to the conductor 95 and to a filtering capacitor 109 connected across the resistor 103. A filtering capacitor 111 is connected across the resistor 103 and the voltage divider 105.

The load-control circuit V, therefore, includes the reference voltage source VI, the output terminals of the bridge IV and that part of the voltage divider 105 located on the cathode side of the adjusting arm 107 relative to the tubes 3 and 5. A component of the D. C. bias for the power tubes 3 and 5, as developed across the bridge IV, is therefore determined by the setting of the reference voltage source VI and by the voltage drop across the lower portion of the voltage divider 105. For purposes of convenience, this lower portion of the voltage divider 105 is designated 112, and the voltage drop thereacross is a function of the field excitation.

An additional component of D. C. bias for the power tubes 3 and 5 is developed across the speed control IV by unbalancing of the bridge at the triode 29. As the grid bias of the triode 29 is driven in a positive direction, its impedence decreases and the output terminal 27 of the bridge swings negative with respect to the output terminal 39. The output terminal 39 swings positive when the grid of triode 29 is driven negative.

The parts described above, including I through VI, are duplicated in the master and slave units, hence, the same reference characters are employed. The differences between the master and slave units appear in the grid circuits for the triodes 29. In the master unit, the grid circuit VII includes a conductor 113 connected to the grid of triode 29 and through a grid current-resistor 115 to an adjusting arm 117 of a voltage divider 119 in the speed-responsive control IX. A D. C. voltage responsive to the speed of the master dynamometer MD is impressed across this voltage divider 119. As shown, the generator MG driven by the master dynamometer is connected through a transformer 121 and a twin-diode rectifier 123 across a ripple-filtering capacitor 125, the latter being in parallel with the potentiometer 119. A connection 127 is made from the positive side of the potentiometer 119 to the speed-setting control VIII.

This speed-setting control includes a D. C. power supply of the type as described heretofore, leading to positive and negative leads 129 and 131, respectively. The latter are connected across series-connected potentiometers 133 and 135. A resistor 137 is connected across the smaller potentiometer 133, which serves to facilitate fine adjustments. The connection 127 is made to an adjusting arm 139 of the potentiometer 133, and a connection 141 is made from an adjusting arm 143 of the larger potentiometer 135 through a resistor 145 to an adjusting arm 147 of the potentiometer 31 connected in the bridge IV. The arrangement is such that connection 127 is positive with respect to the conductor 141, and the voltage impressed across 127 and 141 is controlled by coarse and fine adjustments at 143 and 139, respectively. A capacitor 151 is connected across the two adjoining arms 139 and 143.

The potentiometer 119 is adjusted to provide a maximum speed setting and maximum sensitivity for a particular range. Sensitivity may then be further varied by adjustment of the potentiometer 31. The potentiometers 133 and 135 are set to provide a particular speed.

Referring now to the slave unit, the associated triode 29 and associated bridge IV are under the control of a grid circuit X having a grid-connected conductor 153 connected through a grid current-limiting resistor 155 to an adjusting arm 157 of a potentiometer 159 in the speed-responsive control XI.

A D. C. voltage responsive to the speed of the slave dynamometer SD is developed across the potentiometer 159, which functions as the speed-responsive control XI. The generator SG driven with the slave dynamometer is connected through suitable rectifying apparatus including a transformer 161, a twin-diode rectifier 163, and across a ripple-filtering capacitor 165. To supply the desired speed-responsive voltage, a connection 167 is made from the positive side of the speed-responsive control XI to the synchronizing control XII.

This synchronizing control is a bridge having a twin-triode unit 169 forming one leg of the bridge and resistors 171, 173 and 175 forming the other legs (proceeding from the cathode to the plate of the tube 169). A D. C. voltage provided by a D. C. power supply of the type described heretofore is impressed across the bridge by positive and negative conductors 177 and 179, respectively. The positive conductor 177 is connected intermediate the resistors 173 and 175; and the negative conductor 179 is connected intermediate the tube 169 and the resistor 171. The connection 167 is made to a bridge output terminal at the plate side of the tube 169 adjacent the resistor 175. The other output terminal of the bridge XII is connected by a conductor 181 through the connection 127 to the positive side of the speed-setting control VIII. The negative side of the speed-setting control VIII is connected by conductor 183 through a resistor 185 to an adjusting arm 189 of the potentiometer 31 in the bridge circuit IV for the slave unit.

The grid circuit for the slave triode 29 therefore includes the speed-setting control VIII, the synchronizing bridge XII and the speed-responsive control XI. The voltage supplied by the bridge XII varies with the conductivity of the tube 169 as determined by its grid bias.

This grid bias of tube 169 is a function of the difference in speed between the two dynamometers and is supplied by controls XIII and XIV, which are responsive to the speeds of the master dynamometer and the slave dynamometer, respectively. A cathode connection 191 for the tube 169 is made to an adjusting arm 193 of a potentiometer 195. Resistors 197 and 199 are series-connected with the potentiometer 195 and a D. C. voltage responsive to the speed of the slave dynamometer is impressed across the series-connected elements 195, 197 and 199. This voltage is provided from the generator SG through a transformer 201, a twin-diode rectifier 203 and a ripple-filtering capacitor 205. The positive side of the speed-responsive control XIV is connected at 207 to the positive side of the speed-responsive control XIII. The latter comprises a resistor 209 across which is impressed a D. C. voltage responsive to the speed of the master dynamometer MD provided by the generator MG through a transformer 211, a twin-diode rectifier 213 and a ripple-filtering capacitor 215. The negative side of the speed-responsive control XIII is connected at 217 to the grid of the tube 169.

The arrangement is such that the control means XIII tends to drive the grid of the tube 169 in a negative direction and the control means XIV tends to drive the grid of the tube 169 in a positive direction. The resistors 197 and 199 of control means XIV are selected and the adjusting arm 193 is set so that the output of XIV is substantially matched to the output of XIII when the speeds of the twin dynamometers are equal. When the master dynamometer increases in speed, a positive signal is supplied to the grid of the tube 169 which increases its conductivity and drives the output connection 167 in a negative direction with respect to the output connection 181. The synchronizing control XII then tends to decrease the conductivity of the slave triode 29.

Operation is as follows:

The power circuits I supply rectified current to the field coils MC and SC. As the D. C. bias from each speed control IV increases, the A. C. firing signal supplied from the A. C. source III is advanced relative to the A. C. plate voltage of the rectifiers 3 and 5 to increase conduction. As the D. C. bias from the bridge IV is reduced, the conductivity of the rectifiers is decreased. The excitation of the respective field coil is thereby varied. It will be understood that the speed of the dynamometer varies inversely with the braking effect and that the braking effect varies with the excitation of the field coil.

As mentioned heretofore, the D. C. bias supplied by the bridge IV is an inverse function of the bias of the associated triode 29. Consequently, the conductivity of the rectifying tubes 3 and 5 varies inversely with the grid signal applied to the triode 29.

With the dynamometers MD and SD being driven by their respective engines ME and SE, the first step is to obtain proper controlling action. The polarity of the speed-setting control VIII is such that it tends to decrease the excitation of the field coils MC or SC and increase the speed of the machines MD or SD, whereas the speed-responsive controls IX and XI have the opposite effect. The speed-setting control VIII is adjusted at 139 and 143 to produce a maximum voltage tending to cause the machines to operate under minimum load and with maximum speed. The output of the speed-responsive controls IX and XI resists this tendency so that they are adjusted at 117 and 157, respectively, until a maximum voltage is obtained which is still less than that required to excite the field coils. A high degree of sensitivity of speed regulation is then achieved.

Load is applied to the prime movers ME and SE by reducing the voltage from speed-setting control VIII. The speed of the engines will decrease, hence a particular speed may be obtained. This speed is maintained by the controlling action of the speed-responsive controls IX and XI. Should the speed of the master machine tend to increase, the output of IX increases, causing the output of the bridge IV to increase which in turn results in a greater excitation of the field coil MC and a greater braking action at the dynamometer. The greater braking action tends to maintain the speed of the master machine at the value preselected at the speed-setting control VIII.

The load-controlling action of the circuit V may be used independently of or in conjunction with the speed-controlling action of the bridge IV and associated circuits. There is developed across the portion 112 of the voltage divider 105 a component of voltage which is proportional to the excitation of the field coil MC or SC as the case may be. This component of voltage appears in the load-control circuit V with a polarity such as to have an inverse effect upon the conductivity of the tubes 3 and 5, and is in series opposition with the fixed adjustable voltage obtained from the D. C. voltage source VI. The difference between these voltages appears across the bridge IV connected in the grid circuit II, and the twin-diode tube 63 is so connected that this difference acts as a positive grid bias which may override the output of the bridge as determined by the triode 29.

When the speed control is inoperative, the load-control circuit alone regulates the energization of the dynamometers. The energization is preset by adjustment of the potentiometers 79 and 81 in the load-setting control VI. Thereafter, the desired energization is maintained by the regulating action of the circuit. Should the field excitation of the field coils MC or SC tend to decrease, the voltage at 112 decreases and the net voltage across the bridge IV increases, thereby tending to increase the excitation of the associated field coil. In this manner, the braking effect or load developed by the dynamometer is maintained substantially constant regardless of variations introduced in the voltage supplied by the transformer 1 or resulting from variations in filament heating of the tubes 3 and 5.

When the speed control is used in conjunction with the load control, the load-control circuit determines the minimum energization of the machine, and the speed-control circuit operates to increase the energization should one of the machines tend to increase speed above the value preset at the speed-setting control VIII. In other words, the load-control circuit provides a certain voltage across the bridge IV which is increased when the grid bias of the triode 29 falls below a certain value, as upon speed increase.

Various arrangements of the complete system are possible. For example, the master unit may be primarily adjusted to operate under the load-control circuit V and the slave unit adjusted to operate principally under the control of the synchronizing circuit XII.

The operation of the synchronizing control is such as to cause the slave machine SD to run at the same speed as the master machine MD. Should the speed of the master machine MD change, the output of the associated speed-responsive source XIII changes to vary the grid bias of the triode 169 in the synchronizing bridge XII. In the case of a speed decrease, the conductivity of the triode 169 is increased and the output of the bridge XII is decreased, thereby increasing the output of the bridge IV. This causes the excitation of the field coil SC to increase so that the slave machine also decreases speed with the master machine.

In like manner, should some variation appear in the speed of the slave machine, the speed of the slave machine will be corrected both by the action of its speed-responsive control XI and by the action of the synchronizing control XII which will develop a signal tending to prevent the speed of the slave machine from falling out of step with that of the master machine.

As the slave machine changes speed, there is a tendency for its speed control XI to oppose this change, but it may be overridden by the signal from the synchronizing bridge XII. Consequently, a change in speed of the master machine will result in a desired speed change at the slave machine.

Although the control is described as employed to control a pair of dynamometers, it will be understood that this control may be readily adapted to control other types of machines or more than one slave machine. For example, the control may be adapted for use with slip couplings by mere reversal of the controlling action so that the field excitation of the coupling is controlled in a reverse manner from that of the dynamometers. This action is readily achieved by reversing the grid circuit connections; such as for example 153 and 183 in the slave unit and 113 and 141 in the master unit. The slip couplings are essentially the same in principle as the dynamometers illustrated except that the parts shown by cross-hatching as being anchored in such case would rotate and be driven by prime movers, the present prime movers then being changed to constitute the load elements. Moreover, the control may be adapted for combinations of different types of machines as for a dynamometer and a coupling.

To summarize, the synchronizing unit XII produces a signal which is responsive to the difference in speed between the two machines. This synchronizing signal is fed to the slave unit through circuits XII, X and II, in order that the conductivity of the power tubes 3 and 5 for the slave machine and the field excitation of the slave machine are made a function of the difference in speed between the machines. When the master machine accelerates, a signal developed at XII causes the field excitation of the slave machine SD to decrease and permit acceleration, and vice versa.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A control for synchronizing the operation of two variably energized electrical machines, comprising a power circuit connected to energize the first one of said machines, a gaseous discharge tube connected in said power circuit for varying the energization of said first machine, said tube having a grid and a cathode and a grid-control circuit connected therebetween, said grid-control circuit including a bridge having a plurality of arms, a grid-controlled vacuum tube connected in one of said arms, a first voltage source responsive to the speed of the first machine and a second voltage source responsive to the speed of the second machine, said first and second voltage sources being connected in series opposition to provide a differential voltage responsive to the difference in the respective speeds of said two machines, a power circuit connected to energize said second machine, and means connected to said voltage sources for varying the energization of the power circuit of said second machine in response to said differential voltage.

2. A control for synchronizing the operation of first and second variably energized electrical machines, comprising first and second power circuits connected to energize the respective machines, first and second gaseous discharge tubes connected in the respective power circuits for varying the energization of the respective machines, each of said power tubes having a grid and a cathode, a grid-control circuit connected between the grid and cathode of each of said tubes, first and second voltage sources responsive to the speed of the first machine, a third voltage source responsive to the speed of the second machine, said first voltage source being connected to the grid-control circuit for said first machine, said second and third voltage sources being connected in series opposition to provide a differential voltage responsive to the difference in the respective speeds of said two machines, and means including the grid-control circuit for said second tube connected to said second and third voltage sources for varying the energization of said second power circuit in response to said differential voltage.

3. A control for synchronizing the speeds of first and second variably energized electrical machines, comprising first and second power circuits connected to energize the respective machines, first and second power tubes connected in the respective power circuits to control the energization of the respective machines, each of said power tubes having a grid and a cathode, a grid-control circuit connected between the grid and cathode of each tube respectively, a first speed-responsive voltage source and an adjustable reference voltage source connected in opposition to the grid circuit for the first machine, the first speed-responsive voltage source providing a voltage responsive to the speed of the first machine, a second speed-responsive voltage source providing a voltage responsive to the speed of the second machine connected in opposition with said adjustable reference voltage source to the grid circuit for the second machine, and a synchronizing control providing a voltage responsive to the difference between the speeds of the first and second machines connected to the grid circuit for the second machine, the synchronizing control having connected thereto in opposition a speed-responsive voltage source providing a voltage responsive to the speed of the first machine and a speed-responsive voltage source providing a voltage responsive to the speed of the second machine.

4. A control for synchronizing the operation of two variably energized electrical machines, comprising first and second power circuits connected for independent energization of the two machines, first and second rectifying tubes connected in the respective power circuit for independently varying the energization of the respective machines, each of the rectifying tubes having a control grid and a cathode, first and second grid-control circuits connected between the control grid and cathode of each of the respective rectifying tubes for independently varying the conductivity of the respective tubes, first and second bridges each including a plurality of arms connected in the respective grid-control circuits, each of the bridges having a triode in one arm for varying the output of the respective bridge, a grid-control circuit for each of said triodes, adjustable pre-selecting means connected in common with the triode grid-control circuits, a first voltage source responsive to the speed of the first machine connected in the grid-control circuit of the first triode, a synchronizing control connected in the grid-control circuit of the second triode, and additional voltage sources responsive to the respective speeds of the two machines connected to the synchronizing control to provide a net voltage responsive to the difference in speeds of the two machines.

5. A control as set forth in claim 4 wherein the synchronizing control comprises a bridge including a plurality of arms, a triode vacuum tube connected in one arm, said triode having a control grid and a cathode with a grid-control circuit therebetween, said last-named grid-control circuit being connected to said additional voltage sources and responsive to said net voltage difference.

6. A control for a variably energized electrical machine comprising a power circuit connected to energize the machine, a power tube connected in the power circuit controlling the energization of the machine, the power tube having a grid and a grid-control circuit connected thereto, a bridge including a plurality of arms and having output terminals connected in said grid-control circuit, a load-control circuit responsive to loading of said machine connected across the output terminals of the bridge and having means connected in the power circuit to provide a voltage responsive to the energization of the machine, a triode connected in one arm of the bridge to vary the output thereof, the triode having a grid and a grid-control circuit connected thereto, and a speed-responsive voltage source connected in the grid-control circuit of the triode to provide a voltage responsive to the speed of the machine whereby the energization of said machine is controlled to maintain the speed at a predetermined value within a predetermined load limit.

7. A control for a variably energized electrical machine comprising a power circuit connected to energize the machine, a power tube connected in the power circuit controlling the energization of the machine, the power tube having a grid and a grid-control circuit connected thereto, a bridge including a plurality of arms and having output terminals connected in said grid-control circuit, a load-control circuit responsive to loading of said machine connected across the output terminals of bridge, the load-control circuit including in series opposition an adjustable reference voltage source and means connected in the power circuit to provide a voltage responsive to the energization of the machine, a triode connected in one arm of the bridge to vary the output thereof, the triode having a grid and a grid-control circuit connected thereto, and a speed-setting voltage source and a speed-responsive voltage source providing a voltage responsive to the speed of the machine connected in series opposition in the triode grid-control circuit whereby the energization of said machine is controlled to maintain the speed at a predetermined value within a predetermined load limit.

8. A control for synchronizing the speed of a variably energized electrical slave machine with the speed of a master machine, comprising a power circuit connected to energize the slave machine, a power tube connected in the power circuit controlling the energization of the slave machine, the power tube having a grid and a grid-control circuit connected thereto, a bridge including a plurality of arms and having output terminals connected in the grid-control circuit, a load-control circuit responsive to loading of said slave machine connected across the output terminals of the bridge, the load-control circuit including an adjustable reference voltage source and means connected in the power circuit to provide a voltage responsive to the energization of the slave machine, a first triode connected in one arm of said bridge to vary the output thereof, the first triode having a grid and a grid-control circuit connected thereto, the first triode grid-control circuit including a speed-setting reference voltage source and a speed-responsive voltage source providing a voltage responsive to the speed of the slave machine, a synchronizing bridge including a plurality of arms connected in the grid-control circuit for the first triode, the synchronizing bridge having a second triode connected in one arm thereof, the second triode having a grid and a grid-control circuit connected thereto, and the grid-control circuit for the second triode having connected therein in series opposition a first voltage source responsive to the speed of the slave machine and a second voltage source responsive to the speed of the master machine whereby the speed of said slave machine is maintained synchronized with the speed of said master machine and within a predetermined load limit.

9. A control for synchronizing the speed of a variably energized electrical slave machine with the speed of a master machine, comprising a power circuit connected to energize the slave machine, a power tube connected in the power circuit controlling the energization of the slave machine, the power tube having a grid and grid-control circuit connected thereto, a bridge including a plurality of arms and having output terminals connected in the grid-control circuit of the power tube, a load-control circuit responsive to the loading of the slave machine connected across the output terminals of the bridge and including means connected in the power circuit to provide a voltage responsive to the energization of the slave machine, a triode connected in one arm of the bridge to vary the output thereof, the triode having a grid and a grid-control circuit connected thereto, and synchronizing means connected in the grid-control circuit of the triode to provide a voltage responsive to any difference in speeds between the slave and master machines, the synchronizing means having connected thereto a first speed-responsive voltage source providing a voltage responsive to the speed of the slave machine and a second speed-responsive source providing a voltage responsive to the speed of the master machine whereby the speed of said slave machine is maintained synchronized with the speed of said master machine and within a predetermined load limit.

10. A control for synchronizing the speed of a variably energized electrical machine with the speed of a second variably energized electrical machine, comprising master and slave units controlling the first and second machines respectively, each unit having a power circuit connected to energize the respective machine, a power tube connected in each power circuit controlling the energization of the respective machines, each of the power tubes having a grid and a separate grid-control circuit connected thereto, a bridge including a plurality of arms and having output terminals in the grid-control circuit of the master unit, a load-control circuit responsive to loading of said master machine connected across the output terminals of the bridge, the load-control circuit including an adjustable reference voltage source and means connected in the power circuit of the master unit to provide a voltage responsive to the energization of the master machine, and a synchronizing control connected to the grid-control circuit of the slave unit to provide a voltage responsive to any difference between the speed of the master machine and the speed of the slave machine, the synchronizing control having connected thereto in series opposition a first speed-responsive voltage source providing a voltage responsive to the speed of the first machine and a second speed-responsive voltage source providing a voltage responsive to the speed of the second machine whereby the speed of said slave machine is maintained synchronized with the speed of said master machine and within a predetermined load limit.

11. A control as set forth in claim 10 which further includes a triode connected in one arm of said bridge to vary the output thereof, said triode having a grid and a grid-control circuit connected thereto, and an adjustable speed-setting reference voltage source connected in the triode grid-control circuit whereby the speed of said master machine can be adjusted to various predetermined values.

References Cited in the file of this patent

UNITED STATES PATENTS

| | | |
|---|---|---|
| 1,647,192 | Nyquist | Nov. 1, 1927 |
| 2,482,812 | Treseder | Sept. 27, 1949 |